United States Patent [19]
Selby et al.

[11] Patent Number: 6,019,196
[45] Date of Patent: Feb. 1, 2000

[54] BAG-CONTAINING DEVICE FOR PRECISE REPLACEMENT OF LIQUID BEFORE, DURING, OR AFTER OPERATION OF A MECHANISM, AND METHOD OF ITS USE

[75] Inventors: Theodore W. Selby, 4402 Arbor Dr., Midland, Mich. 48640; Christopher John Rudy, Fort Gratiot Township, St. Clair Co., Mich.

[73] Assignee: Theodore W. Selby, Midland, Mich.

[21] Appl. No.: 08/980,005

[22] Filed: Nov. 26, 1997

Related U.S. Application Data

[63] Continuation-in-part of application No. 08/934,796, Sep. 22, 1997, Pat. No. 5,871,068, which is a continuation of application No. 08/541,735, Oct. 10, 1995, abandoned, which is a continuation-in-part of application No. 08/324,593, Oct. 18, 1994, abandoned.

[51] Int. Cl.⁷ .................. F16C 3/14; F16N 33/00
[52] U.S. Cl. .................. 184/1.5; 184/6.4; 184/7.4; 184/39; 184/105.1; 184/108; 123/196 A; 123/196 S; 222/386.5; 222/395
[58] Field of Search .................. 184/1.5, 6.4, 7.4, 184/39, 105.1, 108; 137/564.5; 123/196 A, 196 S; 222/386.5, 395

[56] References Cited

U.S. PATENT DOCUMENTS

| | | | |
|---|---|---|---|
| 637,250 | 11/1899 | Hall | 137/564.5 |
| 1,493,049 | 5/1924 | Mitchell | 184/39 |
| 1,630,899 | 5/1927 | Lynch | 184/39 |
| 3,033,311 | 5/1962 | Edgar et al. | 184/1.5 |
| 3,112,845 | 12/1963 | Bryant | 222/129 |
| 3,223,291 | 12/1965 | Thomas | 222/249 |
| 3,236,268 | 2/1966 | Simpson | 141/27 |
| 3,370,759 | 2/1968 | Johansson | 222/249 |
| 3,513,941 | 5/1970 | Becnel | 184/1.5 |
| 3,565,287 | 2/1971 | Johnston | 222/26 |
| 4,120,425 | 10/1978 | Bethurum | 222/146 C |
| 4,193,487 | 3/1980 | Takeuchi | 194/9 T |
| 4,438,872 | 3/1984 | Dooley et al. | 222/217 |
| 4,745,989 | 5/1988 | DiMatteo | 184/1.5 |
| 4,869,346 | 9/1989 | Nelson | 184/1.5 |
| 5,044,334 | 9/1991 | Bedi | 123/196 R |
| 5,130,014 | 7/1992 | Volz | 210/130 |
| 5,190,120 | 3/1993 | Watts | 184/1.5 |
| 5,238,085 | 8/1993 | Engelmann | 184/1.5 |
| 5,263,445 | 11/1993 | Bedi et al. | 123/196.005 |
| 5,284,223 | 2/1994 | Fisher | 184/6.4 |
| 5,318,080 | 6/1994 | Viken | 141/98 |
| 5,332,064 | 7/1994 | Liu | 184/108 |
| 5,361,870 | 11/1994 | Courcy | 184/1.5 |
| 5,372,219 | 12/1994 | Peralta | 184/1.5 |
| 5,398,851 | 3/1995 | Sancoff et al. | 222/386.5 |
| 5,871,068 | 2/1999 | Saelby | 184/1.5 |

FOREIGN PATENT DOCUMENTS

| 1023597 | 1/1958 | Germany | 137/564.5 |
|---|---|---|---|

OTHER PUBLICATIONS

U.S. application No. 08324593, Selby, filed Oct. 18, 1994.
U.S. application No. 08541735, Selby, filed Oct. 10, 1995.
U.S. application No. 08934796, Selby, filed Sep. 22, 1997.

*Primary Examiner*—David A. Bucci
*Assistant Examiner*—Chong H. Kim
*Attorney, Agent, or Firm*—Christopher John Rudy

[57] ABSTRACT

Device for precise replacement of liquids in a mechanism includes at least one bag which can be filled with liquid to be delivered precisely to the mechanism or which can hold used liquid. The bag(s) has/have flexible boundaries and may be provided in a housing.

20 Claims, 1 Drawing Sheet

BAG-CONTAINING DEVICE FOR PRECISE REPLACEMENT OF LIQUID BEFORE, DURING, OR AFTER OPERATION OF A MECHANISM, AND METHOD OF ITS USE

CROSS-REFERENCES

This is a divisional of application Ser. No. 08/934,796 filed Sep. 22, 1997, which is a continuation of application Ser. No. 08/541,735 filed Oct. 10, 1995, abandoned, for which the benefit of those filing dates under 35 USC 120 is claimed hereby. The '735 application is a continuation-in-part of application Ser. No. 08/324,593 filed Oct. 18, 1994, abandoned, but benefit of the filing date of the '593 application is not claimed hereby. However, the entire specifications of those three applications are incorporated herein by reference. The '796 application is now U.S. Pat. No. 5,871,068 (Feb. 16, 1999). Notwithstanding the characterization hereof as a continuation-in-part thereof, the benefit of independent and distinct status under 35 USC 121 for each of the claims hereof is also claimed hereby.

BACKGROUND TO THE INVENTION

I. Field

Of concern here is replacement of liquid before, during, or after operation of a mechanism, for example, internal combustion engine oil. The device contains at least one flexible bag for holding and receiving and/or discharging liquid to the mechanism. The method employs the device. The replacement can be precise.

II. Problems and Needs in the Art

With lubricated machinery, for example, the engine and other devices such as transmissions and so forth of modern automobiles, the lubricating liquids need replacement. However, the same are often neglected, much to the detriment of the operating machine.

It would be desirable to be able to replace such lubricants as they and/or their additives are expended or dirtied. It would be desirable further to ameliorate the problem of neglect. It would be desirable also to be able to replace the liquids automatically and/or precisely.

THE INVENTION

I. SUMMARY

The present invention provides a device for precise replacement of liquid comprising: a plurality of flexible bags, at least one of which is for containment of a liquid to be discharged and at least one of which is for containment of a liquid to be collected, the bags being in contact directly or indirectly so as to effectively form a diaphragm between or among them; at least one inlet port in conjunction with each of the at least one bag for containment of a liquid to be collected, and communicating with the interior of each of the at least one bag for containment of a liquid to be collected; and at least one outlet port in conjunction with each of the at least one bag for containment of a liquid to be discharged, and communicating with the interior of each of the at least one bag for containment of a liquid to be discharged; such that when liquid is collected in a bag for discharge, it immediately applies discharge pressure to the remaining bag(s), which, if left to communicate to the exterior through the outlet port(s), expel their contents through the open outlet port(s)—and a sealable housing which has an interior, interior wall(s) and an orifice communicating to the exterior of the housing; at least one flexible bag disposed within the housing, the at least one flexible bag being for containment of a liquid and having an orifice communicating to the exterior of the bag and the housing; such that if liquid is collected in the housing through its orifice the same applies discharge pressure to the bag(s), which, if left to communicate to the exterior through its orifice(s), expel(s) its(their) contents through the open orifice(s); and vice versa. The device can be used in replacement of a fluid of an operating mechanism.

The invention is useful in machine operation and lubrication.

Significantly, flexible walled bag(s) is(are) employed to hold and discharge and/or hold and receive liquid(s). The device permits precise replacement of liquids before, during or after operation of the mechanism, for example, during normal driving of the automobile to precisely replace engine liquid or transmission liquid. Numerous additional advantages attend the invention.

II. DRAWINGS

The drawings form part of the specification hereof. Therein, like features have like numerals, and the following is noted:

III. ILLUSTRATIVE DETAIL

The invention is further illustrated by the following detail, which may be taken in view of the drawings. The same is intended to be illustrative, and not necessarily limiting, in nature.

In general, the invention employs the volume of liquid which is to be replaced to measure the amount of liquid replacing that liquid. The invention requires that the liquid to be replaced be forced by some ways or means into a container already filled with the replacing liquid, but separated from the incoming replacing liquid with a separator wall which is capable of movement, generally within a flexible or inflexible container, which in certain cases herein, for example, with the bag within a bag system, can be provided by the separator wall system itself. Herein, the separator wall is generally in the form of a type of diaphragm, and the same and containment for at least one liquid as well is provided by a flexible bag. A plurality of flexible bags may hold a plurality of liquids. The liquid being pumped into a first container set, i.e., a collecting container set, forces the liquid already filling a second container set, i.e., a discharge container set, to flow back into the mechanism.

The replacement can be highly precise.

One of the unique features of the invention is the ability to maintain or refresh the quality level of replaced liquid for a longer period of time, and thus, protect the mechanism. Also, it can control and handle liquids for eventual clean up or disposal, depending on the subject liquid, and hence, prevent disposal of the liquid into the environment in an unacceptable manner.

Figure 1:
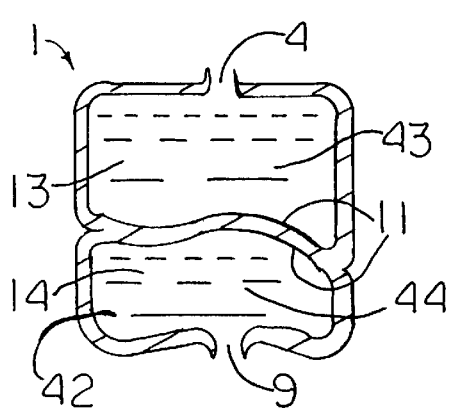
FIG. 1 is a cross-sectional view of an embodiment hereof, having discharge and collection bags to form a type of diaphragm.

In FIG. 1 is seen an embodiment hereof in which diaphragm 11 is formed by areas of fresh discharge bag 43 and used collection bag 44 which lie in side-by-side contact to effect the diaphragm 11. The bags are flexible. The housing 2 can be rigid, or as shown in this figure, flexible but not expansible such as may be provided by a mesh polypropylene and/or metal strand bag 42.

Figure 2:
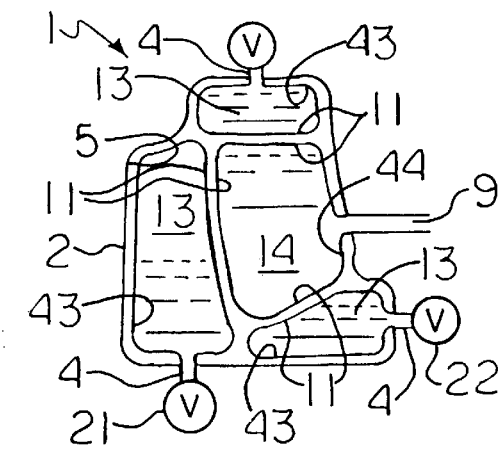
FIGS. 2 & 3 are a cross-sectional views of other embodiments hereof, each having a plurality of discharge bags.

In FIG. 2 is seen another embodiment of the instant invention. This illustrative embodiment (in an extension of the disclosures shown in FIGS. 8 & 10 of the aforementioned '735 and '796 applications) has a plurality of flexible discharge bags 43 activated by collection of used fluid in the flexible bag 44 so as to discharge a plurality of fresh fluids outlet ports 4. Inlet and outlet portions, especially the inlet port 9 of the collecting bag 44, which may be more centrally located, need not be at the "ends" of the housing.

Figure 3:
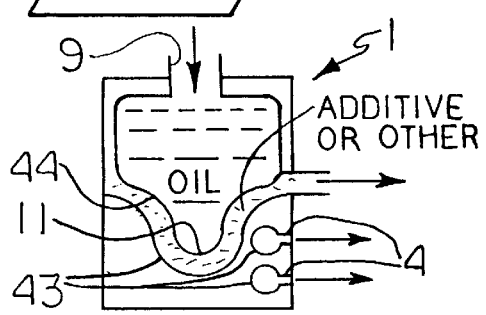

In FIG. 3 is seen an embodiment of the invention having one inlet port 9 and a plurality, here, three, parallel discharge bags 43. The inlet port leads to oil-collecting bag 44, and the three discharge bags may contain oil and/or special additives, which are discharged in turn as the diaphragm 11 presses upon each in turn.

Figure 4:
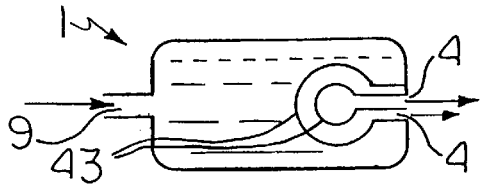
FIGS. 4 & 5 are a cross-sectional views of other embodiments hereof, each having a bag within a bag system, and FIG. 5 also shows a pressure-monitoring exhaustion signal device.
Figure 5:
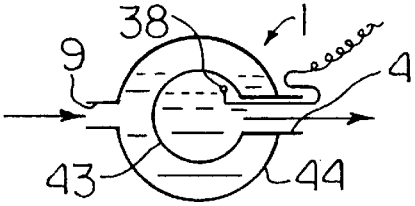

In FIGS. 4 & 5 are seen embodiments of the invention with a bag within a bag. In the case of FIG. 4, two bags are discharge bags 43. Pressure on the flexible bags from a source outside the outer bag of the two activates the discharge. In the case of FIG. 5, one bag 44 is a collecting bag, and the other bag 43 is a discharge bag. Additional flexible bag(s) may be provided within the bag within a bag system.

Figure 6:
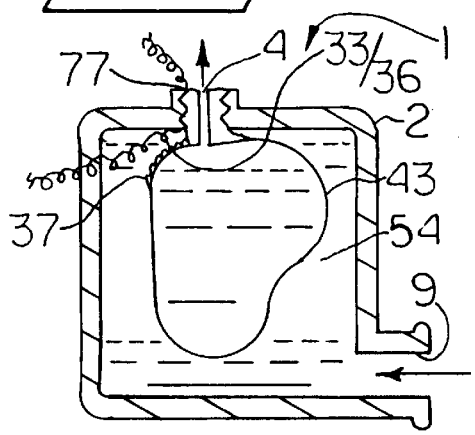
FIG. 6 is a cross-sectional view of another embodiment hereof, having a single bag in a housing, in this case, for discharge, and also showing an electrical exhaustion signal device.

In FIG. 6 is seen an embodiment of the invention where only one flexible bag is present, in this case, as discharge bag 43. The bag 43 is provided within imperforately walled housing 2 and forms a sealed inlet area 54 to which is delivered used liquid, for example, used motor oil, through inlet passage 9 to force discharge of the bag's contents 13, for example, fresh motor oil, out exit 4 and to the engine, which may be running normally. A threaded arrangement 77 may be provided for installation.

Figures 7, 8:
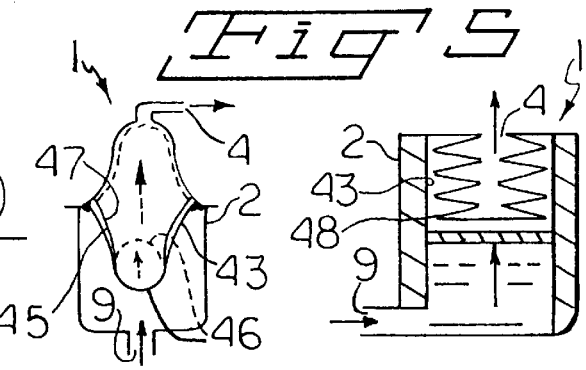
FIG. 7 is a cross-sectional view of an embodiment hereof, having tapered side walls so as to avoid the bag folding back on itself and trapping liquid therein without its discharge.
FIG. 8 is a cross-sectional view of another embodiment hereof, having folding, bellows-type side walls so as to avoid the bag folding back on itself and trapping liquid therein.

In FIGS. 7 & 8 are seen embodiments of the invention having walls which are intended to avoid the bag folding back on itself and trapping liquid therein without its discharge. In each case, one flexible bag is present, as discharge bag 43. The bag can have, for example, side walls 45 which are tapered (FIG. 7) or folded in a bellows-type arrangement (FIG. 8) so as to accomplish this. In the case of the bag of FIG. 7, a bag soft spot 46 folds inward first, followed in turn by increasingly stiffer, thicker portions 47 of the walls, until the contents of the bag 43 are emptied. In the case of the bag of FIG. 8, side wall bellows 48 fold together or collapse as the bag 43 is emptied.

With these bag embodiments, the bags may contact directly or indirectly to provide the diaphragm. The direct contact is by bag boundary to bag boundary touching. The indirect contact may be through an intermediary such as another membrane or web, or a rigid solid, interposed between the bags. A piston may provide contact with the bag (FIG. 8). Further, in the case of an enclosed, generally imperforate housing, saving of course designed entry and exit ports, etc., a neutral liquid or generally noncompressible fluid may be provided within the housing but outside the boundaries of the bags. Thus, when fluid is collected in a bag, it immediately applies discharge pressure to the remaining bag(s) in the housing, which, if left to communicate to the exterior through exit or outlet port(s) 4 as when valve(s) 21/22, etc., are opened, expel their contents through the open exit or outlet port(s) 4.

More than one inlet port 9 may be present.

As will be apparent to those skilled in the art, the devices of this invention 1 can be used in combination with metering devices, filters, various signal devices such as an exhaustion device, and other equipment. For instance, the metering device can be as simple as that provided by gravity flow, wherein the diameter of the interior of the tube can be the metering device and control the amount of flow from the device 1. The other devices that can be employed in combination with the flexible bag-containing devices may be in fluid transmission lines, or may be installed either in front of or behind the inventive device, as long as the minimum requirements are met in order to utilize the device of the invention. It is contemplated to be within the practice of this invention, for instance, to incorporate one or more of these combinable devices into a housing 2. For example, a filter could be installed in the inventive device at the inlet end of the device 1 for filtering the used liquid as it makes its way into the device 1, for example, an internal combustion engine. In this case, a by-pass device would permit the used oil to be circulated through the engine and oil filter even as small amounts of the used oil are metered into the oil replacement device 1 itself. To further illumine such other devices, as contemplated and alluded to generally above, which any person skilled in the art would recognize, the simple expedient of there being no more fluid to discharge from an outlet port 4 would cause a drop in pressure thereat, which can be readily measured by devices such as a pressure-monitoring device 38 well known in the art and as can be seen in FIG. 5. In addition, the exhaustion device or signal, for example, may be provided by simple action of flexible bag(s), which form(s) diaphragm(s) 11, particularly one(s) having imbedded wires 37 exposed for contact with a contact point 36 or area, which may touch the contact point 36 or area at the end of its(their) travel 33 or at a point or points 37 along the way to the end of its(their) travel so as to close electrical circuit(s) and trigger the signal(s) as can be seen in FIG. 6.

IV. CONCLUSION

The present invention is thus provided. Numerous adaptations and modifications can be effected within its spirit, the literal claim scope of which is particularly pointed out as follows:

We claim:

1. In combination, an operating mechanism and a device for precise replacement of liquid in an operating mechanism, comprising:

the operating mechanism which can contain a liquid; and in communication with the operating mechanism, the device for precise replacement of liquid in the operating mechanism, which device includes:

a plurality of flexible bags, each for containment of liquid, at least one of which flexible bags is adapted for containment of a liquid to be discharged and at least one of which flexible bags is adapted for containment of a liquid to be collected, the flexible bags being in contact, wherein the contact is selected from the group consisting of direct contact and indirect contact, so that an inter-bag diaphragm can be effectively formed with respect to the flexible bags;

at least one inlet port in conjunction with each of the at least one flexible bag adapted for containment of a liquid to be collected, the at least one inlet port being capable of communicating with the interior of each of the at least one flexible bag adapted for containment of a liquid to be collected; and at least one outlet port in conjunction with each of the at least one flexible bag adapted for containment of a liquid to be discharged, the at least on outlet port being capable of communicating with the interior of each of the at least one flexible bag adapted for containment of a liquid to be discharged;

such that when liquid is collected in the at least one flexible bag adapted for containment of a liquid to be collected, the at least one flexible bag adapted for containment of a liquid to be collected immediately applies discharge pressure to the at least one flexible bag adapted for containment of a liquid to be discharged, and, simultaneously, when liquid is contained in the at least one flexible bag adapted for containment of a liquid to be discharged, and with the at least one outlet port being left open to communicate to the exterior through the at least one outlet port, liquid contents of the at least one flexible bag adapted for containment of a liquid to be discharged can be expelled through the at least one outlet port left open;

such that the precise replacement of liquid in the operating mechanism, when the operating mechanism is in liquid communication with the device and when the device is working to replace the liquid, is controlled by liquid pressure from used liquid from the operating mechanism, which used liquid is the liquid which then enters in the at least one flexible bag adapted for containment of a liquid to be collected of the device; and such that, when the device is working to replace the liquid, the liquid is replaced during normal operation of the mechanism and wherein each said liquid is at least one of a lubricant and an additive therefor.

2. The combination of claim 1, further including a housing to the device, which housing has an interior, at least one interior wall, and inlet and outlet portions, in which housing the plurality of flexible bags reside, and wherein:

the at least one inlet port communicates with the interior of the housing through the inlet portion; and the at least one outlet port communicates with the interior of the housing through the outlet portion.

3. The combination of claim 2, wherein there are two flexible bags in the device.

4. The combination of claim 2, wherein the housing is enclosed.

5. The combination of claim 2, wherein the housing is flexible.

6. A device for precise replacement of liquid in an operating mechanism, comprising:

a plurality of flexible bags, each for containment of a liquid, at least one of which flexible bags is adapted for containment of a liquid to be discharged and at least one of which flexible bags is adapted for containment of a liquid to be collected, the flexible bags being in contact, wherein the contact is selected from the group consisting of direct contact and indirect contact, so that an inter-bag diaphragm can be effectively formed with respect to the flexible bags;

at least one inlet port in conjunction with each of the at least one flexible bag adapted for containment of a liquid to be collected, the at least one inlet port being capable of communicating with the interior of each of the at least one flexible bag adapted for containment of a liquid to be collected; and at least one outlet port in conjunction with each of the at least one flexible bag adapted for containment of a liquid to be discharged, the at least on outlet sort being capable of communicating with the interior of each of the at least one flexible bag adapted for containment of a liquid to be discharged;

such that when liquid is collected in the at least one flexible bag adapted for containment of a liquid to be collected, the at least one flexible bag adapted for containment of a liquid to be collected immediately applies discharge pressure to the at least one flexible bag adapted for containment of a liquid to be discharged, and, simultaneously, when liquid is contained in the at least one flexible bag adapted for containment of a liquid to be discharged, and with the at least one outlet port being left open to communicate to the exterior through the at least one outlet port, liquid contents of the at least one flexible bag adapted for containment of a liquid to be discharged can be expelled through the at least one outlet port left open;

such that the precise replacement of liquid in the operating mechanism, when the operating mechanism is in liquid communication with the device and when the device is working to replace the liquid, is controlled by liquid pressure from used liquid from the operating mechanism, which used liquid is the liquid which then enters in the at least one flexible bag adapted for containment of a liquid to be collected of the device; and such that, when the device is working to replace the liquid, the liquid is replaced during normal operation of the mechanism wherein a bag within a bag system is present by inclusion of a first bag within a bag system flexible bag which is for containment of liquid within another bag within a bag system flexible bag which is for containment not only of the first bag within a bag system flexible bag but also of another liquid.

7. The device of claim 6, wherein the bag within a bag system forms a housing intrinsically, without external housing support.

8. The device of claim 7, wherein two flexible bags are present in the bag within a bag system.

9. The device of claim 6, further comprising a housing which has an interior, at least one interior wall, and inlet and outlet portions, in which housing the plurality of flexible bags resides, and wherein:

the at least one inlet port communicates with the interior of the housing through the inlet portion;

the at least one outlet port communicates with the interior of the housing through the outlet portion; and the bag within a bag system has at least two flexible bags which can discharge liquid.

10. The combination of claim 1, further including lubricating liquid for the operating mechanism—wherein the operating mechanism is an internal combustion engine to a motor vehicle; the lubricating liquid which can be replaced by the device is motor oil, and the motor oil can be replaced during normal driving.

11. The combination of claim 1, further including lubricating liquid for the operating mechanism—wherein the operating mechanism is an automatic transmission to a motor vehicle; the lubricating liquid is automatic transmission fluid, and the automatic transmission fluid can be replaced during normal driving.

12. The combination of claim 1, further including in the device an exhaustion signal to signal when the device has exhausted its supply of liquid in the at least one outlet port of the device.

13. In combination, an operating mechanism and a device for precise replacement of liquid in the operating mechanism comprising:

the operating mechanism which can contain a liquid; and the device for precise replacement of liquid in the operating mechanism, which device includes:

a sealable housing which has an interior, at least one interior wall and an orifice communicating exterior of the housing, at least one flexible bag disposed within the housing, the at least one flexible bag being for containment of a liquid and having an orifice communicating to the exterior of the bag and the housing;

such that, if liquid is collected in the sealable housing through the orifice of the sealable housing, discharge pressure is applied to the at least one flexible bag disposed within the sealable housing, and, simultaneously, when liquid is contained in the at least one flexible bag disposed within the sealable housing, and with the orifice of the at least one flexible bag disposed within the sealable housing being left open to communicate to the exterior through the orifice of the at least one flexible bag disposed within the housing, liquid contents of the at least one flexible bag disposed within the sealable housing can be expelled through the left open orifice of the at least one flexible bag disposed within the housing; and such that if liquid is collected in the at least one flexible bag disposed within the sealable housing through the orifice of the at least one bag disposed within the sealable housing, discharge pressure is applied to any liquid in the sealable housing not within the at least one flexible bag disposed within the sealable housing and, simultaneously, when liquid is contained in the sealable housing not within the at least one flexible bag disposed within the sealable housing, and with the orifice of the sealable housing being left open to communicate to the exterior through the orifice of the sealable housing, liquid contents of the sealable housing not within the at least one flexible bag disposed within the housing can be expelled through the left open orifice of the sealable housing;

such that the precise replacement of liquid in the operating mechanism, when the operating mechanism is in liquid communication with the device and when the device is working to replace the liquid, is controlled by liquid pressure from used liquid from the operating mechanism, which used liquid is the liquid which then enters in the at least one flexible bag adapted for containment of a liquid to be collected of the device; and such that, when the device is working to replace the liquid, the liquid is replaced during normal operation of the mechanism.

14. The combination of claim 13, wherein, with respect to the device, one flexible bag is present within the sealable housing.

15. The combination of claim 13, wherein, with respect to the device, the flexible bag within the sealable housing has walls which are intended to avoid having the flexible bag folding back on the flexible bag within the sealable housing and trapping liquid therein without discharge of the liquid trapped therein.

16. The combination of claim 15, wherein, with respect to the device, said walls are selected from the group consisting of side walls which are tapered and side walls which are folded in a bellows-type arrangement.

17. The combination of claim 13, wherein the operating mechanism is an internal combustion engine; the liquid which can be replaced by the device is motor oil, and the motor oil can be replaced during normal driving.

18. The combination of claim 13, wherein the operating mechanism is an automatic transmission, the liquid which can be replaced by the device is automatic transmission fluid, and the automatic transmission fluid can be replaced during normal driving.

19. In further combination, the combination of claim 13 and an exhaustion signal to signal when the device has exhausted its supply of liquid in an orifice serving as an outlet end.

20. A method for precise replacement of liquid in an operating mechanism, which method comprises:

providing a device for precise replacement of liquid which includes at least one device selected from the group consisting of (A) a plurality of flexible bags, at least one of which is for containment of a dischargeable liquid, and at least one of which is for containment of a collectible liquid, the flexible bags being in contact, wherein the contact is selected from the group consisting of direct contact and indirect contact, so that an inter-bag diaphragm can be effectively formed with respect to the flexible bags; at least one inlet port in conjunction with the at least one flexible bag adapted for containment of the collectible liquid, the at least one inlet port being capable of communicating with the interior of the at least one flexible bag adapted for containment of the collectible liquid; and at least one outlet port in conjunction with the at least one flexible bag adapted for containment of the dischargeable liquid, the at least one outlet port being capable of communicating with the interior of the at least one flexible bag adapted for containment of the dischargeable liquid; such that, when the collectible liquid is collected in the at least one flexible bag adapted for containment of the collectible liquid, the at least one flexible bag adapted for containment of the collectible liquid immediately applies discharge pressure to the at least one flexible bag adapted for containment of the dischargeable liquid, and, simultaneously, when the dischargeable liquid is contained in the at least one flexible bag adapted for containment of the dischargeable liquid, and with the at least one outlet port being left open to communicate to the exterior through the at least one outlet port, dischargeable liquid contents of the at least one flexible bag adapted for containment of the dischargeable liquid can be expelled through the at least one outlet port left open; such that the precise replacement of liquid in the operating mechanism, when the operating mechanism is in liquid communication with the device and when the device is working to replace the liquid of the operating mechanism, is controlled by liquid pressure from used liquid from the operating mechanism, which used liquid is the collectible liquid which then enters in the at least one flexible bag adapted for containment of the collectible liquid of the device, and such that, when the device is working to replace the liquid of the operating mechanism, the liquid of the operating mechanism is replaced during normal operation of the operating mechanism—and (B) a sealable housing which has an interior, at least one interior wall and an orifice communicating exterior of the housing; at least one flexible bag disposed within the housing, the at least one flexible bag being for containment of a liquid and having an orifice communicating to the exterior of the bag and the housing; such that, on one hand, if a collectible liquid is collected in the sealable housing through the orifice of the sealable housing, discharge pressure is applied to the at least one flexible bag disposed within the sealable housing, and, simultaneously, when a dischargeable liquid is contained in the at least one flexible bag disposed within the sealable housing, and with the orifice of the at least one flexible bag disposed within the sealable housing being left open to communicate to the exterior through the orifice of the at least one flexible bag disposed within the housing, dischargeable liquid contents of the at least one flexible bag disposed within the sealable housing can be expelled through the left open orifice of the at least one flexible bag disposed within the housing; and such that, on the other hand, if a collectible liquid is collected in the at least one flexible bag disposed within the sealable housing through the orifice of the at least one bag disposed within the sealable housing, discharge pressure is applied to a dischargeable liquid in the sealable housing not within the at least one flexible bag disposed within the sealable housing, and, simultaneously, when the dischargeable liquid is contained in the sealable housing not within the at least one flexible bag disposed within the sealable housing, and with the orifice of the sealable housing being left open to communicate to the exterior through the orifice of the sealable housing, dischargeable liquid contents of the sealable housing not within the at least one flexible bag disposed within the housing can be expelled through the left open orifice of the sealable housing; such that the precise replacement of liquid in the operating mechanism, when the operating mechanism is in liquid communication with the device and when the device is working to replace the liquid of the operating mechanism, is controlled by liquid pressure from used liquid from the operating mechanism, which used liquid is the collectible liquid, and such that, when the device is working to replace the liquid of the operating mechanism, the liquid of the operating mechanism is replaced during normal operation of the operating mechanism;

providing the operating mechanism, which requires at least one liquid for operation of the operating mechanism;

attaching said device with said mechanism so that said device and said mechanism are in operative liquid communication with each other;

operating said mechanism under normal operating conditions, and precisely replacing at least part of the at least one liquid in said mechanism, which is the used, collectible liquid, with at least one dischargeable liquid from said device while said mechanism is so operating;

with the proviso that, when the operating mechanism is part of a motor vehicle, liquid of the operating mechanism can be replaced during normal driving of the motor vehicle;

and wherein each said liquid is at least one of a lubricant and an additive therefor.

\* \* \* \* \*

UNITED STATES PATENT AND TRADEMARK OFFICE
CERTIFICATE OF CORRECTION

PATENT NO. : 6,019,196
DATED : Feb. 1, 2000
INVENTOR(S) : Selby et al.

It is certified that error appears in the above-identified patent and that said Letters Patent is hereby corrected as shown below:

On the title page: , item No. 63, delete "abandoned, which is a continuation-in-part of application No. 08/324,593, Oct. 18, 1994," entirely.

column 1, about line 7, delete "divisional" and insert therefor -- continuation-in-part --.

Signed and Sealed this

Seventeenth Day of October, 2000

Attest:

Q. TODD DICKINSON

*Attesting Officer*　　　　　*Director of Patents and Trademarks*